US005309303A
:::

United States Patent [19]

Hsia et al.

[11] Patent Number: 5,309,303
[45] Date of Patent: May 3, 1994

[54] SUBAMBIENT PRESSURE AIR BEARING SLIDER FOR DISK DRIVE

[75] Inventors: Yiao-Tee Hsia, Shrewsbury; Coda H. T. Pan, Millbury, both of Mass.

[73] Assignee: Digital Equipment Corporation, Maynard, Mass.

[21] Appl. No.: 851,054

[22] Filed: Mar. 13, 1992

Related U.S. Application Data

[63] Continuation-in-part of Ser. No. 663,192, Feb. 28, 1991, Pat. No. 5,097,370, which is a continuation of Ser. No. 325,222, Mar. 17, 1989, abandoned.

[51] Int. Cl.$^5$ .................................................. G11B 5/60
[52] U.S. Cl. ............................................................ 360/103
[58] Field of Search ........................................... 360/103

[56] References Cited

U.S. PATENT DOCUMENTS

| | | |
|---|---|---|
| 3,855,625 | 12/1974 | Garnier et al. |
| 4,218,715 | 8/1980 | Garnier |
| 4,420,780 | 12/1983 | Deckert |
| 4,475,135 | 10/1984 | Warner et al. |
| 4,553,184 | 11/1985 | Ogishima |
| 4,555,739 | 11/1985 | Le Van et al. |
| 4,802,042 | 1/1989 | Strom |
| 4,894,740 | 1/1990 | Chhabra et al. |
| 5,200,868 | 4/1993 | Chapin ............................ 360/103 |

FOREIGN PATENT DOCUMENTS

| | | |
|---|---|---|
| 0015383 | 3/1979 | European Pat. Off. |
| 0076361 | 4/1983 | European Pat. Off. |
| 0277414 | 8/1988 | European Pat. Off. |
| 0387444 | 9/1990 | European Pat. Off. |
| 58-23359 | 2/1983 | Japan |
| 58-64670 | 4/1983 | Japan |
| 60-109073 | 6/1985 | Japan |

OTHER PUBLICATIONS

Kogure et al., "Mechanical Characteristics of Floating Head and Recording Media for 3.2 G Byte Integration Type Magnetic Recording Disk", NTT Public Corp., *Elec. Commun. Lab. Tech. J.*, pp. 291-297 (Jan. 1982).

Tagawa, "Optimum Design Consideration for Air-Lubricated Slider Bearings of Film Head", N.E.C. Research and Development, 68:90-100 (1983).

IBM T.D.B., vol. 27, No. 10A, Mar. 1985; Magnetic Disk Storage System with Structured Magnetic Head Slider; pp. 5820-5821.

*Primary Examiner*—A. J. Heinz
*Attorney, Agent, or Firm*—Fish & Richardson

[57] ABSTRACT

A slider that moves a transducer across a surface of a rotating storage disk includes an island that protrudes from a surface of a subambient pressure cavity for supporting the transducer, the island having length and width dimensions that are less than those of the slider. A groove is positioned at the forward end of at least one of the side rails that define the cavity to allow air to flow between the cavity and an area outside of said cavity. The groove serves to maintain the distance between the surface of that rail and the disk surface equal to the distance between the surface of the other rail and the disk surface as the slider moves across the disk. The rail includes a plurality of grooves for equalizing the flying heights of the rails; a first one of the grooves intersects the cavity to allow air to flow between the cavity and an area outside of the slider, while and a second one of the grooves is spaced from the cavity by a portion of the rail.

41 Claims, 8 Drawing Sheets

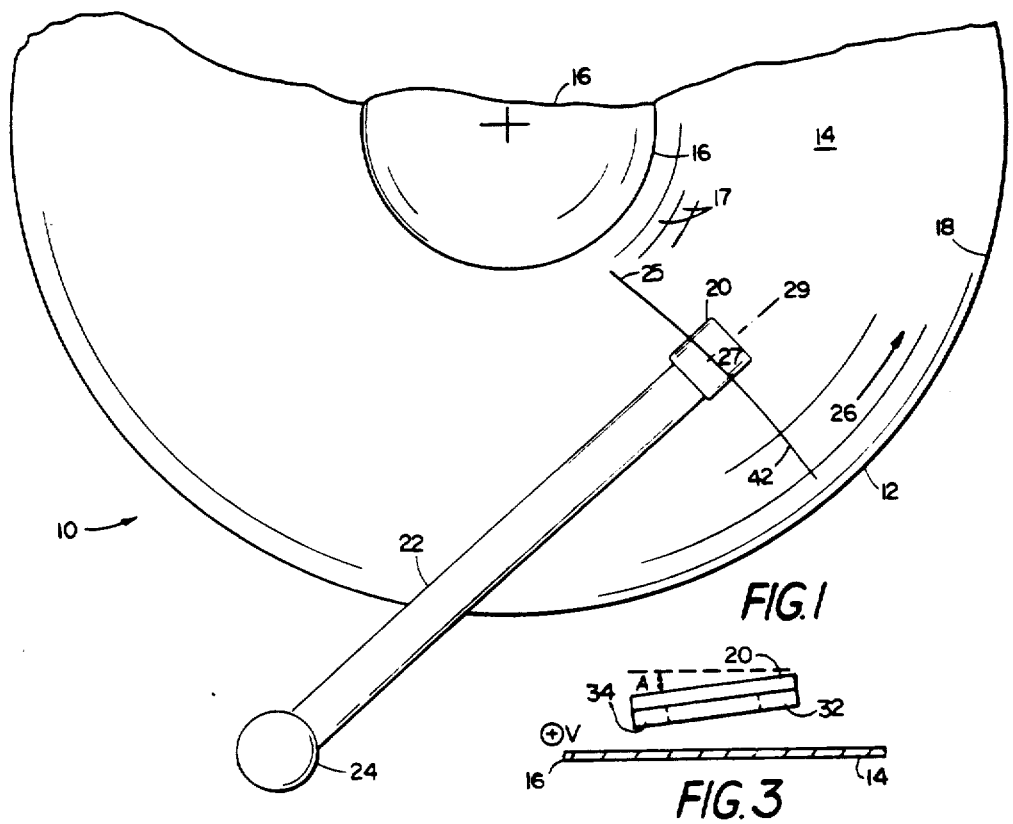
FIG. 1
FIG. 3
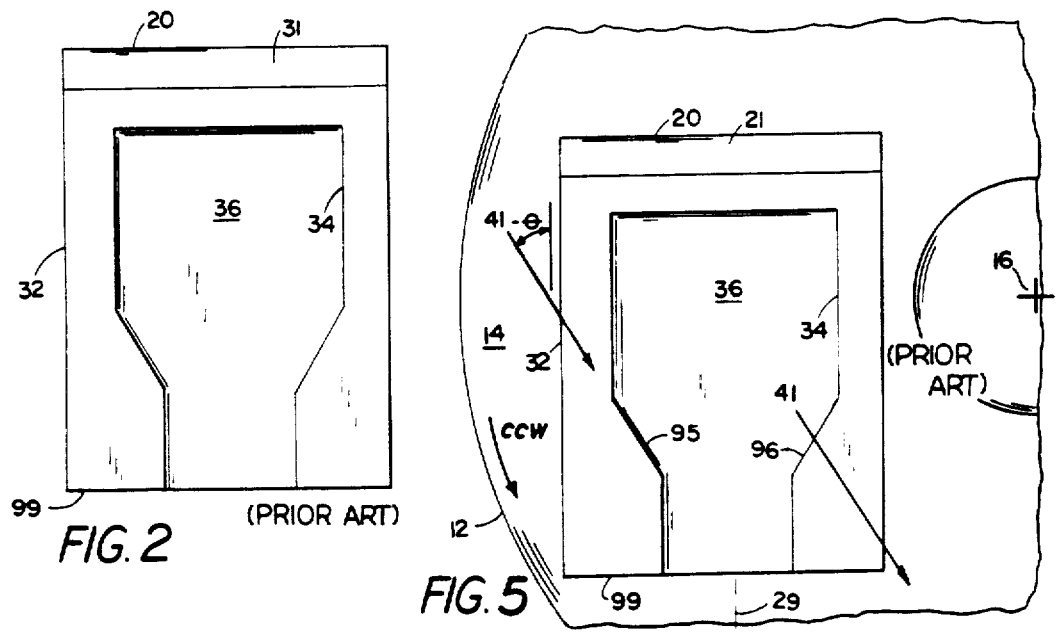
FIG. 2 (PRIOR ART)
FIG. 5

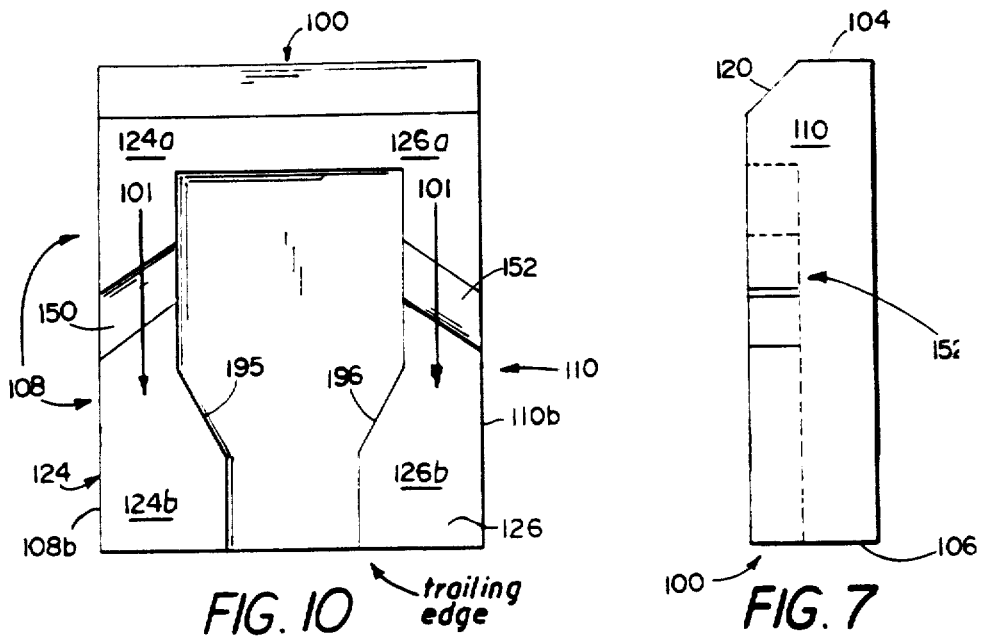
FIG. 10
FIG. 7
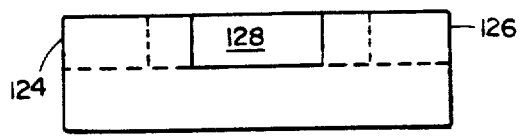
FIG. 8
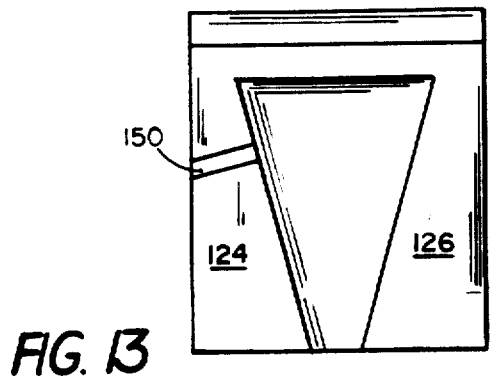
FIG. 13
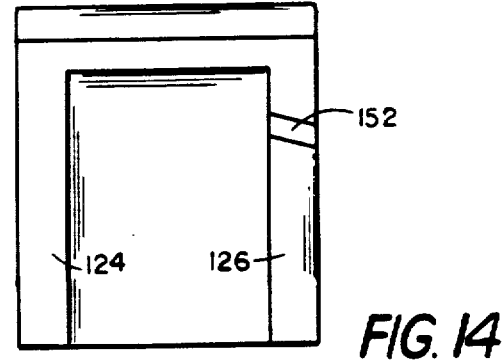
FIG. 14
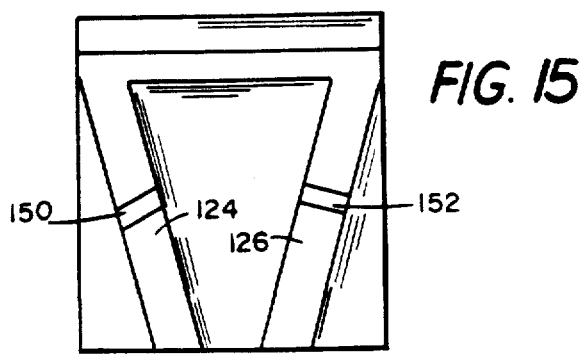
FIG. 15

SUBAMBIENT PRESSURE AIR BEARING SLIDER FOR DISK DRIVE

This application is a continuation-in-part of copending application. Ser. No. 07/663,192, filed Feb. 8, 1991, U.S. Pat. No. 5,097,370, which is a continuation of Ser. No. 07/325,222, filed Mar. 17, 1989, now abandoned. Both applications are incorporated herein by reference.

BACKGROUND OF THE INVENTION

This invention relates to sliders for recording heads used with storage disks.

In a typical magnetic or optical disk storage system, a read/write head is mounted on the rear end of a slider (i.e., at the rearward edge of the slider). The slider is supported by a positioning arm/suspension assembly and configured so that when the disk is rotated rapidly, the slider flies at a height above the disk. To achieve high storage densities, the slider must be flown close to the disk surface. One technique is to mechanically bias the positioning assembly to force the slider toward the disk. Another proposed approach is to contour the slider bottom so that it generates subambient (or negative) pressure to draw the bottom of the slider down near the disk.

One known approach for contouring the slider bottom is to provide the slider with a pair of side rails that extend along the length of the slider and define a cavity between them which generates the negative pressure. The rails typically extend to the rearward or trailing edge of the slider, and the rearward end of each rail generally supports one read/write head or other transducer.

In flight, sliders are subject to roll, which is the banking of the slider relative to a horizontal axis of the positioning arm. Sliders are also subject to yaw, where the trailing edge of a slider is either closer to (positive yaw) or farther from (negative yaw) the disk center than is the slider leading edge. The yaw angle is measured as the angle between the longitudinal axis of the slider and the tangent to the disk track.

SUMMARY OF THE INVENTION

In one aspect of the invention, a slider that moves a transducer across a surface of a rotating storage disk includes an island that protrudes from a surface of a subambient pressure cavity for supporting the transducer, the island having length and width dimensions that are less than those of the slider.

Preferred embodiments include the following features.

The island is disposed to position the transducer centrally with respect to the width dimension of the slider. This helps reduce the effect of roll on the transducer, because the slider as it rolls rotates about its central axis. The cavity extends longitudinally along the length dimension of the slider between the slider's forward and rearward (or trailing) edges, and the island is disposed adjacent to the rearward edge and terminates substantially rearwardly of the forward edge. Preferably, the island does not substantially extend longitudinally into the cavity. This helps minimize the effect of the island on the flying characteristics of the slider.

The slider includes a pair of spaced, longitudinally extending side rails disposed between the forward and rearward edges that define the cavity therebetween. The rails terminate at ends disposed forwardly of the rearward edge of the slider, and the island is disposed adjacent to the rearward edge and terminates proximate to the ends of said rails. Preferably, the island is laterally disposed between said rails and is laterally spaced from each of said side rails. This helps provide paths for air to flow from the cavity, around the island, and out from beneath the slider.

The forward portion of the island is oriented obliquely with respect to the longitudinal axis. For example, the sides of the island are inclined and meet at the forward end of said slider. This, together with the lateral spacing between the island and side rails, aids in removing dust and other debris from the cavity and from beneath the slider. As a result, buildup of debris on slider surfaces (such as the edges of the islands), which could otherwise interfere with the ability of the slider to fly above the disk, is avoided.

In one embodiment, the island has a width dimension that is substantially constant over its height. In another embodiment, the width decreases with height, such as in a series of discrete steps.

In another aspect of the invention, the slider has a groove positioned at the forward end of at least one of its side rails to allow air to flow between the cavity and an area outside of said cavity, the groove serving to maintain the distance between the surface of that rail and the disk surface equal to the distance between the surface of the other rail and the disk surface as the slider moves across the disk.

Disposing the groove at the forward end of the rail reduces the sensitivity of the flying height of the slider to changes in altitude of the disk drive. That is, for a given increase in altitude, the flying height of the slider decreases by a smaller amount with the groove disposed at the forward end of the rail than with the groove located further rearwardly on the rail.

Preferred embodiments include the following features.

The slider may include the island for supporting the transducer, or not.

The groove intersects the cavity at a junction between the forward end of the rail and a ramp section that defines the forward extent of the cavity. The groove is disposed at an oblique angle with respect to the longitudinal axis of said slider. This assists in passing debris from the groove to the outside of the slider, thereby avoiding collection of debris within the groove.

Preferably, both rails include the groove.

In yet another aspect of the invention, at least one of the slider rails includes a plurality of grooves disposed therein for maintaining the distance between the surface of that rail and the disk surface equal to the distance between the surface of the other rail and the disk surface as the slider moves across the disk; a first one of the grooves intersects the cavity to allow air to flow between the cavity and an area outside of the slider, and a second one of the grooves is spaced from the cavity by a portion of the rail.

Preferred embodiments include the following features.

The slider may or may not include the island for the transducer.

The first groove is disposed forwardly of the second groove, is located at the forward end of the rail, and is configured to relieve the relatively high pressure that develops under the rail and induce a relatively low pressure under the groove. The side surfaces of the rails define a subambient pressure cavity, and are disposed obliquely to a lower surface of the cavity. The oblique surfaces tend to induce inequalities in the distances between the surfaces of the rails and the disk as said slider moves across the disk surface. The second groove is configured to relieve the relatively high pressure (that redevelops under the rail between the grooves) and induce relatively low pressure under the second groove, thereby substantially correcting the inequalities in the distances between the rails and the disk.

The first and second grooves are preferably disposed in both side rails.

Other advantages and features will become apparent from the following description of the preferred embodiment, and from the claims.

BRIEF DESCRIPTION OF THE DRAWINGS

FIG. 1 is a plan view of a portion of a magnetic disk storage device with a slider on an exemplary arm at zero yaw angle.

FIG. 2 is a bottom view of a prior art subambient pressure slider.

FIG. 3 is a view of a slider flying over a disk in a positive roll attitude.

FIG. 5 is a bottom view of the slider of FIG. 2 flying at a negative yaw angle, shown looking through a "transparent" disk.

FIGS. 7 and 8 are a side view and trailing edge view, respectively, of the slider of FIG. 6, not to scale.

FIG. 10 shows the slider of FIG. 6 oriented parallel to the direction of air flow.

FIGS. 13-15 are alternative configurations of the slider of FIG. 6.

DESCRIPTION OF PREFERRED EMBODIMENTS

Figure 4:
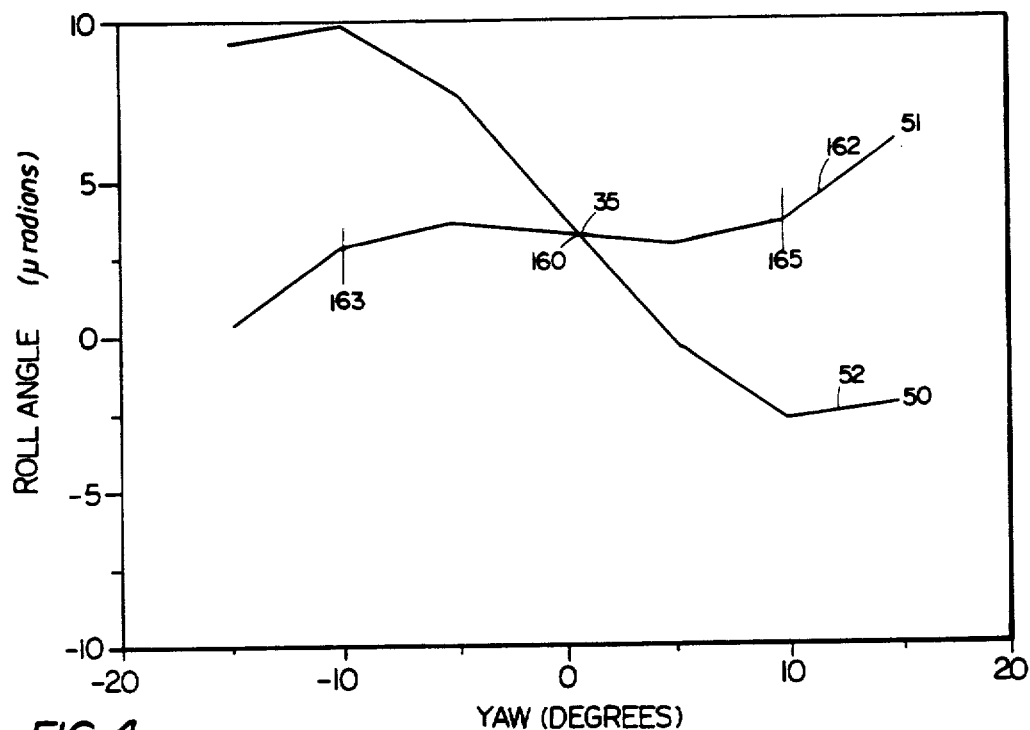
FIG. 4 is a graph of simulated representative roll angle as a function of yaw angle for a conventional subambient slider and for a slider according to an embodiment of the invention.

Referring to FIGS. 1 and 2, a typical disk storage device 10 includes a disk 12 having a surface 14 which extends from an inner radius 16 to an outer radius 18, with a multiplicity of recording tracks 17 defined on surface 14. A read/write head (not shown) is typically located on a slider 20 along trailing edge 99 (FIG. 5) facing surface 14. Slider 20 is mounted on a positioning arm/suspension assembly 22. Arm 22 is connected to and driven by a rotary actuator 24 capable of positioning slider 20 at any point along an arc 25 extending from inner radius 16 to outer radius 18. Disk 12 rotates beneath head 20 at high speed in a direction (as indicated by arrow 26). When the slider is positioned at a point 27 approximately midway along arc 25, the longitudinal axis 29 of slider 20 is tangential to the recording track 17 at that position, with zero yaw angle. At other positions of arm 22, the slider is at a yaw angle to the tangent.

Referring to FIG. 2, a typical subambient pressure slider 20 has two rails 32, 34 that face the disk surface 14, and a subambient pressure cavity 36. Air flowing between the disk and slider past a leading ramp 31 and under rails 32, 34 creates relatively high pressure under the rails to lift the slider above surface 14. Air flowing through cavity 36 is intended to create a counteracting subambient pressure to draw the slider toward surface 14. The net result is that a lower external load is required to fly the slider for a given height.

A small, relatively constant pressure difference is generated beneath rail 32 and rail 34, even when the slider is at zero yaw angle, i.e., at the tangential location 27 (FIG. 1), because of a small difference in the linear velocity of the disk at the two different locations beneath the two rails (points nearer the inner radius 16 of disk 12 have a lower linear velocity than points nearer the outer edge).

Thus, even without yaw, that pressure difference between rails 32 and 34 causes slider 20 to roll slightly. As shown in FIG. 3, the inner rail 34 flies closer to the disk center than does the outer rail 32, defining a "positive" natural roll angle A. The amount of the roll could be, e.g., 2.5 $\mu$ radians, shown at point 35 on curve 50, FIG. 4, which corresponds to the zero yaw point 27 on FIG. 1. If the slider were always kept at a zero yaw angle (i.e., tangential to the disk track), this type of roll would be relatively uniform regardless of the position of slider 20 along arc 25, and this could be compensated such as by counterweighting.

In the configuration of FIG. 1, however, as slider 20 moves along arc 25, its yaw angle will change, resulting in a changing roll angle. These variances in roll are caused by changes in the angle of attack $\Theta$ of the air flow on the slider. For example, referring to FIG. 5, with slider 20 (seen through "transparent" disk 12) at a negative yaw angle, e.g. $-10°$, (corresponding, for example, to point 42 on arc 25, FIG. 1) air strikes the rails of slider 20 (as indicated by air flow lines 41) at an angle of $-10°$ ($\Theta$) relative to the longitudinal axis 29 of slider 20, which causes an additional roll component (about $+7\frac{1}{2}$ microradians) to be combined with the inherent roll effect (angle A; about $+2\frac{1}{2}$ microradians) of the slider. This additional roll component varies nonlinearly with yaw angle in accordance with a curve like curve 50, and is thus not subject to simple compensation b counterweighting.

As can be seen in curve 50, FIG. 4, negative yaw results in a positive angular roll component which adds to the inherent roll (angle A), while positive yaw results in a relative negative roll component which competes with inherent roll (angle A). Nevertheless, we have observed that it is possible to configure a slider to neutralize or relieve the additional roll component related to yaw angle, as will be explained in detail below.

Figure 6:
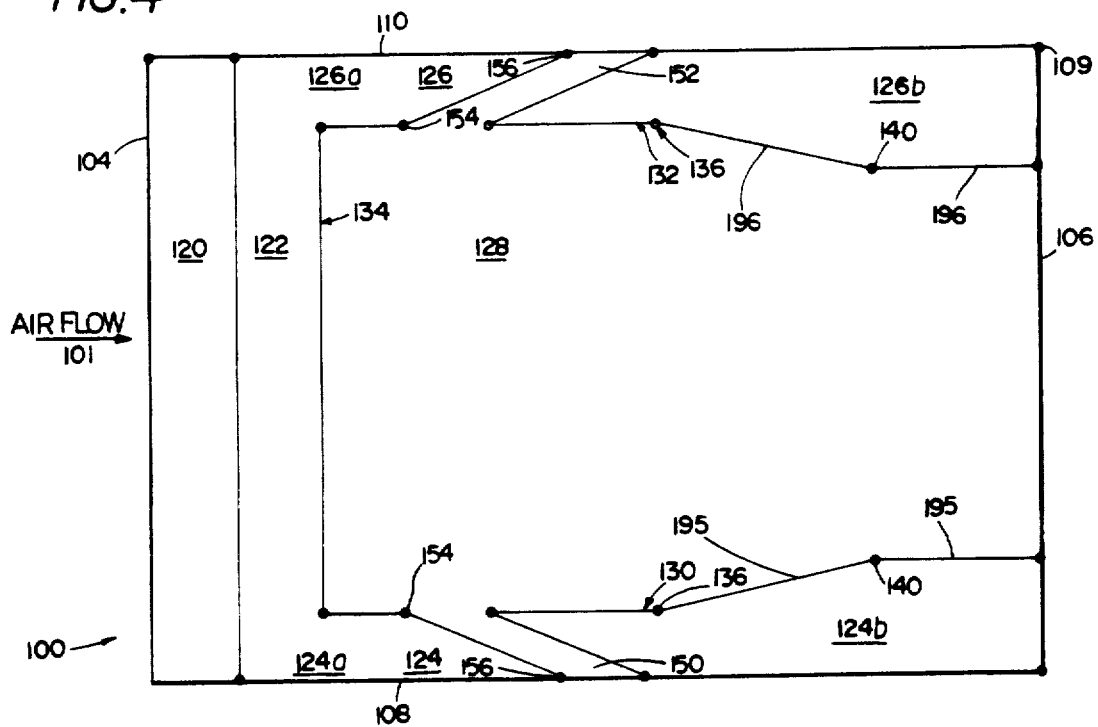
FIG. 6 is a bottom view of a subambient pressure slider according to an embodiment of the present invention.

Referring to FIGS. 6, 7, 8, in an embodiment of the invention, rectangular slider 100 has a leading (or forward) edge 104, a trailing (or rearward) edge 106, and two side edges 108, 110. A ramp 120 extends from leading edge 104 at an angle, for example of 50 minutes (not to scale in FIG. 7). A cross rail, or bridge, 122, located immediately downstream of ramp 120, joins two side rails 124, 126. Inner edges 130, 132 of rails 124, 126 run parallel, beginning where they connect to bridge 122 and continuing rearward to break points 136. From break points 136 to another pair of break points 140, inner edges 130, 132 define foils 195, 196 which flair inward toward each other, for example at an angle of about 15 degrees (not to scale in FIG. 6). From break points 140 foils 195, 196 extend back to trailing edge 106, and are parallel.

Inner edges 130, 132 (including foils 195, 196), together with bridge 122, enclose a subambient pressure cavity 128. Preferably, cavity 128 has a depth of from 200 microinches to 1000 microinches and is open along the trailing edge. Depending on the design for a given drive, the ramp angle will typically range at or below one degree and the flare angle will range as desired.

Slider 100 includes a pair of chevrons 150, 152, that cut across rails 124, 126, and connect cavity 128 to the exterior of slider 100. Chevrons 150, 152 are located between inner edge 134 of bridge 122 and break points 136 and extend rearward at an angle from a pair of points 154 along the inner edges 130, 132, to points 156 along sides 108, 110. Preferably chevrons 150, 152 have the same depth as cavity 128. Depending upon design considerations, chevron angles and depths may be of varied configurations.

Figure 9B:
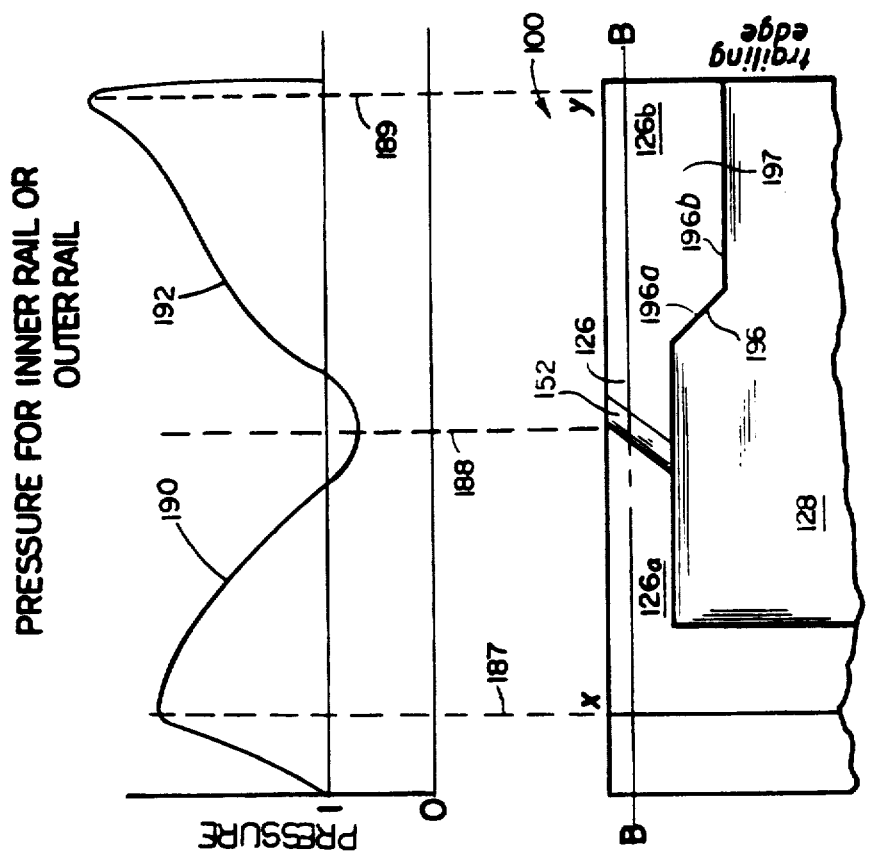
FIG. 9b relates to the pressure profile for an inner rail or outer rail to the rail configuration in a slider according to the present invention.
Figure 9A:
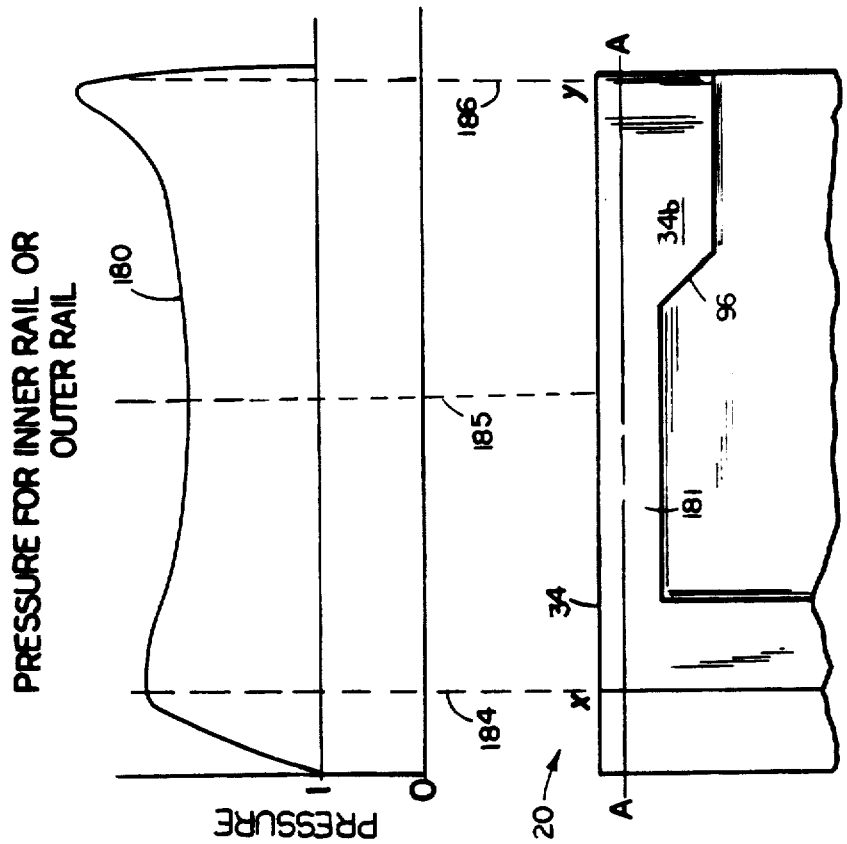
FIG. 9a relates the pressure profile for an inner rail or outer rail to the rail configuration in a prior art slider.

Referring to FIG. 9a, the pressure gradient under an example prior art rail 72 is shown (along line A—A) where dotted lines 184, 185, 186 relate local minima and local maxima of pressure gradient curve 180 to the configuration of rail 72.

Referring now to FIG. 9b, the expected pressure gradient under rail 126 (along line B—B) in practice of the present invention has been approximated, where dotted lines 187, 188, and 189 relate local minima and local maxima of pressure gradient curve 190 to the configuration of rail 126. FIG. 9b demonstrates our belief that an entirely different gradient buildup is experienced compared to the prior art configuration of FIG. 9a. To wit: curve 190 peaks at about the beginning of cavity 128 (point X) and is relieved down to about atmospheric level or lower at chevron 152. Thereafter, the pressure gradient peaks again at point Y near the trailing edge of slider 100.

In either configuration of FIG. 9a or 9b, as slider 20 (FIG. 5) or 100 (FIG. 10) goes into negative yaw, a respective foil 96, 196 will turn into the air flow. However, owing to the chevron configuration of the invention, substantially different roll response will be experienced. This is because several factors influence the tendency for a yaw attitude to induce a roll attitude.

Among these are (a) pressure gradient under the slider (such as under the rails) relative to the transverse sliding component due to yaw, and (b) the effective local wedge of any oblique edge presented by the slider. Hence, the chevron effects the gradient and the flair presents an oblique edge, as yield favorable results.

Since force is directly proportional to pressure time area, the incremental increase ($\Delta$) in pressure related to section 126b (for a negative yawed embodiment of the invention) compared to that related to equivalent section 34b (after the dotted line 185 in prior art FIG. 9a) is as shown below:

$$\frac{\Delta P126b}{\Delta P124b} \geq \frac{\Delta P34b}{\Delta P32b}$$

The same comparison related to positive yaw is:

$$\frac{\Delta P124b}{\Delta P126b} \geq \frac{\Delta P32b}{\Delta P34b}$$

Therefore, in practice of the present invention, as slider 100 experiences negative yaw air flow 101 impinges upon the effective wedge of foil 196 of section 126b (either solely at flair 196a or in conjunction with extension 196b) after chevron 152 of rail 126, whereupon an incremental pressure increase is generated (as indicated by the steep climb of curve 190 from low point 191). This pressure increase is greater here than that generated at section 124b, given the negative yaw of the slider, causing rail 126 to fly higher than rail 124. We speculate that foil 196 cooperates with chevron 152 to produce this favorable result. In an alternative embodiment, the flared foil 196 might not flare at all and yet still would present an oblique edge of the negatively yawed slider turned into the air flow, which, in cooperation with chevron 152, would yield the favorable result we have discovered.

Figure 11:
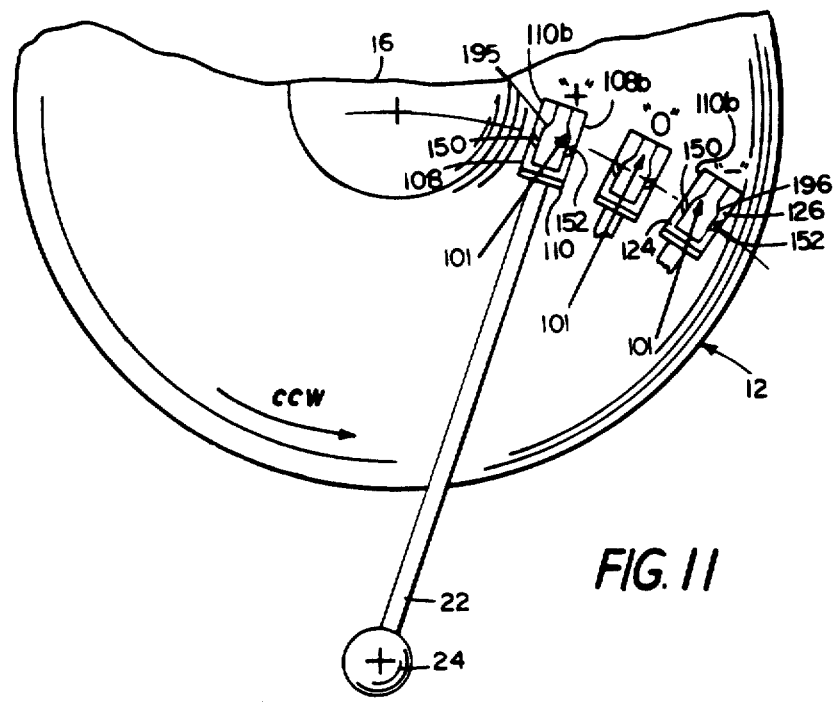
FIG. 11 shows an upward facing slider in three different orientations (positive, zero and negative yaw) relative to a disk, where the air bearing surface of the slider is shown looking through a "transparent" disk.

FIGS. 10 and 11 together show slider 100 in the positive, zero and negative yaw conditions, where it can be seen that as slider 100 yaws, not only is foil 195 or 196 presented to air flow 101, but also the now leading outside edge 108 or 110 is presented as an oblique edge. It is possible that the resultant interaction of the air flow at both the inner foil 195 or 196 and outer foil 108 or 110 (or possibly at post-chevron foils 108b or 110b) contributes to the result of the invention.

According to curve 51 of FIG. 4, in practice of the present invention, between about zero and about negative ten degrees yaw, only about zero to perhaps one-half microradians additional roll component (compared to a very substantial roll component shown in curve 50) is imparted to the slider. Beyond about negative ten degrees yaw, a negative roll component is imparted to the slider.

It will now be understood that, in the negative yaw condition, foil 195 is essentially turned away from air flow 101, although outer foil 108 (or 108b) on rail 124 is presented to air flow 101. It is speculated that the cross-sectional area of foil 196 presented to air flow 101 should be greater than that presented by foil 108b, thus resulting in the desired gradient at rail 126, such as seen in FIG. 11.

In the positive yaw condition, the features of the invention will apply likewise to chevron 150, foil 195, rail 124 and the outer wall foil 110b, and will result in roll-reducing compensation. Comparing curves 50, 51, it will thus be seen that the invention will provide a positive roll component to cancel the relative negative roll of the positively yawed slider, at least up to about ten degrees yaw for the case shown. It will be appreciated, however, that the 10 degree yaw is not a limitation of the invention.

Thus it will now be appreciated that for a non-zero yaw angle, chevrons 150, 152 and foils 195, 196, 108b, 110b, are not oriented symmetrically with respect to air flow 101. This lack of symmetry affects the air flow beneath rails 124, 126 and in cavity 128, resulting in a reduction of the roll-inducing pressure differential beneath the slider that would otherwise be associated with a non-zero yaw angle roll in a prior art device (see curve 50, FIG. 4). Therefore, the variation in roll angle as a function of yaw angle (typically experienced by prior art subambient pressure sliders) can be substantially reduced, or eliminated, in practice of the present invention, as indicated by curve 51 of FIG. 5. Hence, in one embodiment of the invention, between yaw angles of roughly ±10 degrees, an approximate uniformity of roll angle was measured, and nearer uniformity was experienced even beyond ±10 degrees, comparing curve 51 to curve 50.

The lowered sensitivity of slider 100 to yaw angle with regard to roll angle eliminates roll as a major difficulty in the implementation of subambient pressure sliders in disk drive systems. The use of chevrons achieves this result without affecting the other characteristics of subambient pressure sliders including, for example, low flying height with low external load, higher air bearing stiffness and better damping.

Figure 12:
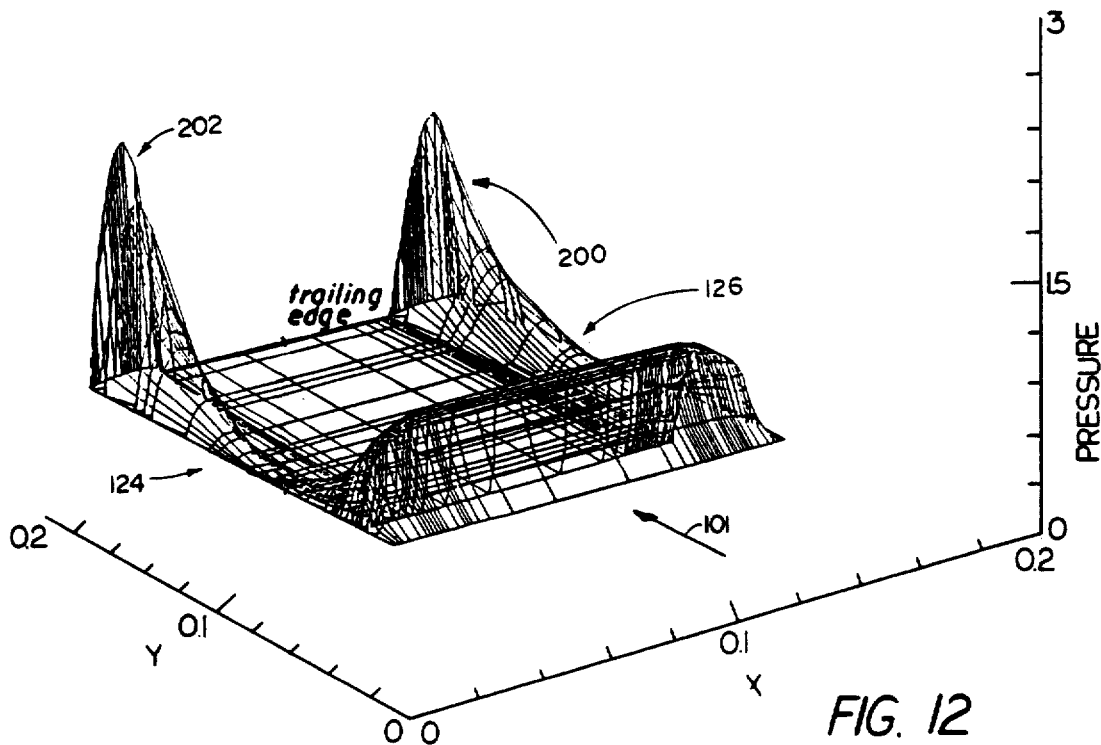
FIG. 12 is a graph of a simulated pressure profile at the bottom of a slider according to an embodiment of the invention at zero yaw angle.

FIG. 12 is a graph of a simulated pressure profile at the bottom of a slider according to the preferred embodiment at zero yaw angle.

Alternative embodiments of the invention are shown in FIGS. 13–15, where rails 124, 126 assume tapered in (FIG. 13), fully parallel and not tapered (FIG. 14), and not parallel and not tapered (FIG. 15) orientations. In addition, at least one chevron 150, 152 can be provided in at least one rail 124 or 126 at any suitable location in accordance with the invention.

Furthermore, while chevron configurations have been described, other pressure impacting configurations are equally considered within the present invention, including inserts, grooves, slots, structures, details, incisions, features, passages, barriers, and the like.

The optimum configuration of a slider in practice of the present invention will depend upon desired application, e.g., for a given arm, disk, slider, radius and yaw relation, and speed, for example. Hence, determination of optimum foil flare angle length can be numerically modelled by solving the following modified Reynolds equation:

$$\frac{\partial}{\partial x}\left[ph^3\frac{\partial p}{\partial x}\left(1 + \frac{6\lambda}{n}\right)\right] +$$

$$\frac{\partial}{\partial y}\left[ph^3\frac{\partial p}{\partial y}\left(1 + \frac{6\lambda}{n}\right)\right] = 6\mu U\frac{\partial}{\partial x}(ph)$$

(where h = film thickness, p = pressure, u = linear velocity of disk, x = spatial coordinate in length, y = spatial coordinate in width, μ = viscosity of gas, and λ = molecular mean free path of gas), for flying height performance, including trailing edge height, roll angle and pitch. This is an iterative process.

OTHER EMBODIMENTS

Still other embodiments are within the following claims.

Figure 16:
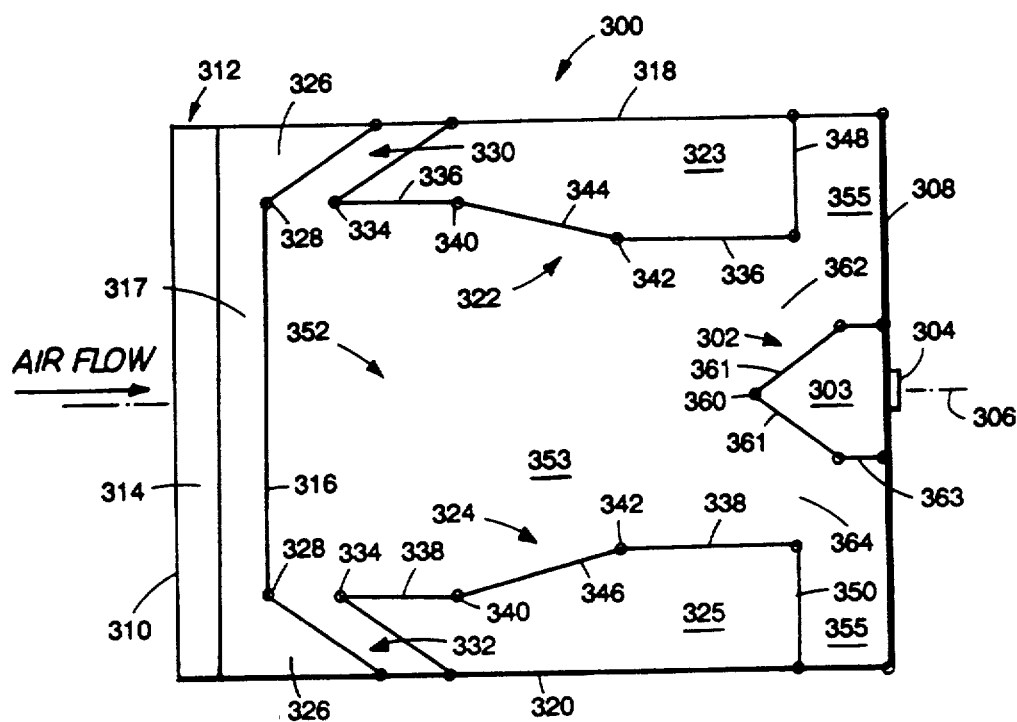
FIG. 16 is a bottom view of a subambient pressure slider according to another embodiment of the invention, in which the slider includes a centrally-disposed island for supporting a transducer.
Figure 17:
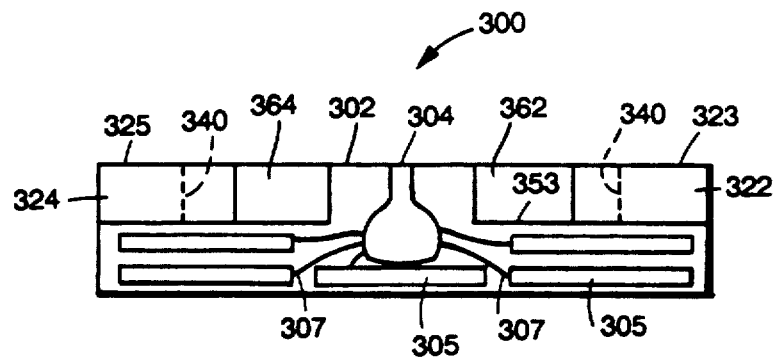
FIG. 17 is a trailing edge view of the slider of FIG. 16.

For example, FIGS. 16 and 17 (which are not to scale) show a slider configuration particularly useful for small-size sliders. By way of background, the size of sliders has decreased substantially in recent years. One example of this decrease in size is the so-called "submini" slider, dimensions of which are some 70% of the dimensions of the so-called "unity" slider (which for some time represented the standard slider size). A still smaller slider, known as the "nano" slider has dimensions that are only about 50% of those of the unity slider; the so-called "pico" slider is even smaller, having dimensions that are only about 35% of the dimensions of the unity slider.

As slider size decreases, the roll stiffness of the slider decreases, causing the slider to be less resistant to roll. Slider 300 of FIGS. 16 and 17 is configured to be somewhat immune to the effects of roll despite decreases in roll stiffness that accompany reduction in slider size, while maintaining low roll sensitivity to changes in yaw angle. The dimensions of slider 300 given below are for the so-called "nano" slider size, but it is to be understood that the invention applies as well to different slider sizes, including larger sliders (such as submini and unity sliders) and smaller sliders (e.g., pico sliders).

Slider 300 includes an island 302 for supporting a transducer 304 (such as a read/write head, shown exaggerated in size for purposes of illustration) at or near the center of the width of slider 300. Island 302 is laterally centered about the central, longitudinal axis 306 of slider 300 and is coextensive with the rearward or trailing edge 308 of slider 300. (FIG. 16 shows slider 300 at a yaw angle of 0°, with the air flow direction along central axis 306.) One reason for using island 302 (rather than the side rails of the slider) to support transducer 304 is that insufficient room may exist on small sliders (such as nano and pico sliders) to accommodate more than one transducer (with its associated bonding pads and wire leads) at the trailing end. Disposing the island at the lateral center of slider 300 reduces the contribution made by island 302 and transducer 304 (and the associated bonding pads and leads) to roll. Moreover, because slider 300 as its rolls will rotate about axis 306, transducer 304 will experience less roll when disposed on axis 306 than if it were disposed at the trailing edge 308 behind one of the slider rails.

At the forward or leading edge 310 of slider 300 is disposed a ramp section 312, which includes an inclined forward portion 314 (sloped at an angle of between approximately 27.5 minutes and 50 minutes) immediately forward of a lateral cross rail or bridge 316 Extending longitudinally along side edges 318, 320 of slider 300 are a pair of side rails 322, 324. The forward ends 326 of side rails 322, 324 terminate at junctions 328 with ramp section 312. Side rails 322, 324 include chevrons 330, 332, which are, for example, grooves disposed through rails 322, 324. Chevrons 330, 332 are disposed in forward ends 326 of side rails 322, 324, beginning at junctions 328 with cross rail 316, for purposes to be described.

Inner edges 336, 338 begin at points 334 and run parallel to each other and to side edges 318, 320 to break points 340. Between break points 340 and another pair of break points 342, inner edge 336, 338 define a pair of foils 344, 346 (which serve the same purpose as foils 195, 196 (FIG. 6) discussed above). Foils 344, 346 each define an angle of approximately 15° with axis 306 and flair inwardly toward each other. From break points 342, inner edges 336, 338 extend parallel to each other and terminate at the rearward edges 348, 350 of side rails 318, 320, respectively. Rearward side rail edges 348, 350 are disposed forwardly of trailing edge 308 of slider 300 for purposes to be described, and surfaces 355 bridge the distance to trailing edge 308.

Surfaces 323, 325 of side rails 322, 324, respectively, are coplanar with each other and with the surface 317 of cross rail 316. Inner edges 336, 338 (and foils 344, 346) and ramp section 312 enclose a subambient pressure cavity 352, the lower surface or bed 353 of which is coplanar with surfaces 355 behind side rails 322, 324. Subambient cavity 352 has a depth of between 200 microinches and 1000 microinches, and preferably between 300 microinches and 500 microinches, with respect to rail surfaces 317, 323, and 325, and is preferably the same depth as chevrons 330, 332. The forward and rearward ends of subambient cavity 352 are defined by cross rail 316 and side rail ends 348, 350, respectively.

Island 302 protrudes from surfaces 353, 355 and is the same height as side rails 322, 324 (i.e., the surface 303 of island 302 is coplanar with rail surfaces 323, 325). The forward end 360 of island 302 extends only slightly into subambient cavity 352 (that is, forward end 360 is disposed proximate to rearward ends 348, 350 of side rails 322, 324). As may be appreciated from FIG. 16, island 302 terminates well rearwardly of the major portions of the lengths of side rails 322, 324 and cross rail 316, and is thus much shorter in length than slider 300. Indeed, island 302 need not extend into cavity 352 at all, and may terminate coextensively with, or rearwardly of, rail ends 348, 350. Island 302 need only be sufficiently long (and wide) to support transducer 304 and withstand the stresses (e.g., forces applied by air flowing beneath slider 300 and forces applied to island during periods of contact with the disk) experienced during use.

For example, in a "nano" configuration, slider 300 is approximately 0.080 inches long, and the forward end of cavity 352 is disposed about 0.070 inches from trailing edge 308. The length of island 302 (between trailing edge 308 and forward end 360) is substantially smaller—for example, 0.015 inches or less. Approximately two-thirds of the length of island 302 are disposed behind set back side rail edges 348, 350. Note that even if side rails 322, 324 were to extend to trailing edge 308, island 302 would extend only partially (such as approximately 20%) into cavity 352. Island 302 is thus sufficiently small as to only minimally affect the air flow characteristics of subambient cavity 352.

Island 302 is centered about longitudinal axis 306 and has a width substantially less than that of slider 300. For example, slider 300 is about 0.063 inches wide, and the width of island 302 is only approximately 0.015 inches. Island 302 is also spaced laterally from inner edges 336, 338 of side rails 322, 324, respectively, to provide a pair of channels 362, 364 therebetween. Channels 362, 364 provide paths that allow air to flow smoothly beneath slider 300 and escape from cavity 352 around island 302, and that assist in allowing debris (such as dust particles and other contaminants) that enter subambient cavity 352 during operation of the disk drive to escape from cavity 352 rather than building up on the edges of island 302 and side rails 322, 324 and interfering with the ability of slider 300 to fly above the disk surface. Channels 362, 364 are approximately 0.010 inches wide.

Debris removal and the diversion of air flow around island 302 are also facilitated by orienting the outer edges 361 of the forward portion of island 302 obliquely (such as at 45°) with respect to axis 306. Debris that strikes inclined edges 361 is thus much more likely to continue passing through channels 362, 364 and out from beneath slider 300 than if the forward end of island 302 were arranged, e.g., perpendicularly to axis 306. (Of course, other arrangements of edges 361 are possible. For example, edges 361 may be curved rather than linear. Also, the edges of island 302 may extend obliquely from trailing edge 308 instead of running parallel to each other for a short distance 363, as shown in FIG. 16.)

Rearward edges 348, 350 of side rails 322, 324, respectively, are spaced approximately 0.010 inches forward of trailing edge 308. Because slider 300 flies above the surface of the disk in a pitched orientation—with trailing edge 308 being disposed approximately 10 microinches closer to the disk surface than the forward edge of cross rail 316—terminating side rails 322, 324 forwardly of trailing edge 308 minimizes the surface area of slider 300 that can potentially contact the disk, particularly during slider takeoff and landing. Reducing this contact area lowers the risk of damage to slider 300 and the disk that may occur when disk rotation is started and stopped. Forward ends 326 of side rails 322, 324 are disposed about 0.010 inches behind forward slider edge 310; this distance is divided somewhat equally between ramp 314 and cross rail 316.

In their widest regions (i.e., the portions between each break point 342 and each rearward edge 348, 350), each side rails 322, 324 is about 0.014 inches across. Each side rail 322, 324 decreases in width as the rail extends forwardly between break points 342, 340 so that, forwardly of break points 340, the width of each side rail 322, 324 is limited to approximately 0.009 inches. Chevrons 330, 332 are preferably grooves cut through the entire width of respective side rails 322, 324. Each chevron 330, 332 intercepts subambient cavity 352 in a opening approximately 0.005 inches to 0.009 inches long along axis 306. The sides of each channel 330, 332 are parallel to each other. Channels 330, 332 are inclined with respect to axis 306 (for example, at 45°). This also assists in the removal of debris from subambient cavity 352, thereby reducing the possibility that the debris may become lodged in channels 330, 332 and interfere with the ability of slider 300 to fly above the disk surface.

As shown in FIG. 17, rearward edge 306 of slider 300 has sufficient room for the bonding pads 305 and leads 307 for a single transduce 304 (which is, for example, a magneto-resistive (MR) read/write head). It is to be understood that the number of bonding pads 305 and leads 307 shown in FIG. 17 is for purposes of illustration only. More or fewer than five pads 305 and leads 307 may be used (for example, an inductive read/write head may require only three pads 305 and leads 307).

Slider 300 operates substantially as described above for other embodiments of this invention, and in particular has low sensitivity to yaw angle with respect to roll angle, despite its small size. As with the sliders discussed above, we believe that this is due to the pressure relief beneath side rails 332, 324 that chevrons 330, 332 provide, as well as the oblique edges that foils 344, 346 present to the air flow over large ranges of positive and negative yaw angles. Although wires (not shown) that connect bonding pads 305 to external circuitry introduce some roll bias to slider 300 (due to the excessively small slider dimensions), the bias is relatively insensitive to changes in yaw angle. Moreover, slider 300 is relatively insensitive to this bias due to the positioning of transducer 304 on the longitudinal axis 306 about which slider 300 rolls.

Figure 18:
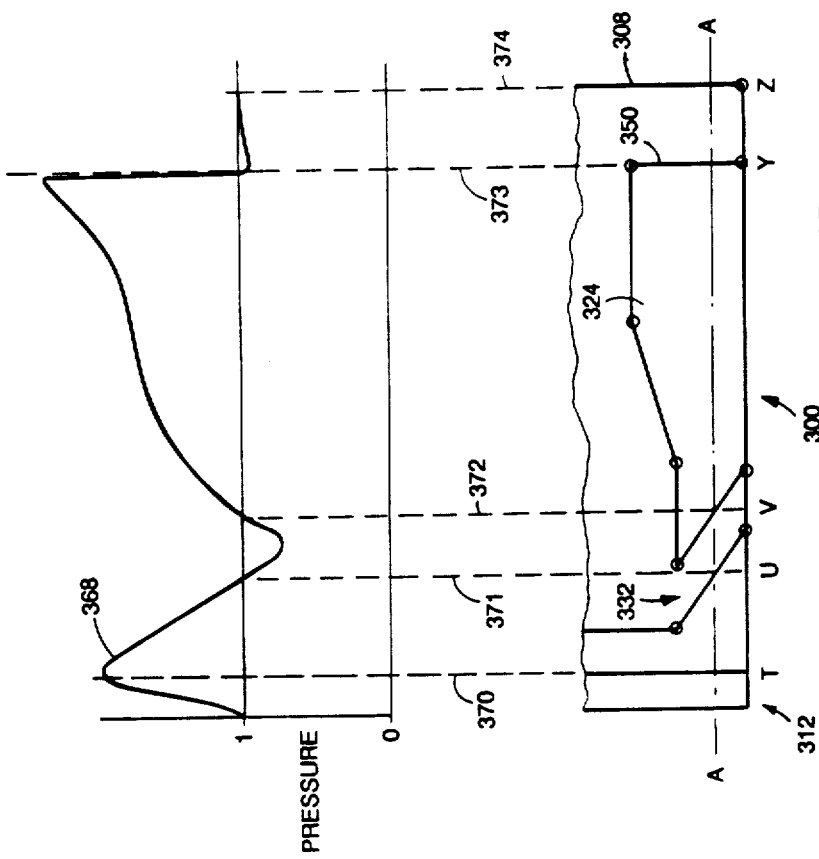
FIG. 18 relates to the pressure profile for an inner rail or outer rail to the rail configuration of the slider of FIG. 16.

FIG. 18, approximates the expected pressure gradient 368 (along line A—A) under one side rail 324. Dashed lines 370, 371, 372, 347, 374 relate local maxima and atmospheric pressure crossings (i.e., points at which pressure=1) of pressure gradient curve 368 to rail configuration. Expected pressure gradient curve 368 peaks significantly above atmospheric pressure at approximately the forward edge of cross rail 316 (point T), is relieved to below atmospheric pressure at chevron 332, and again builds up under the portion of the side rail disposed behind chevron 332. Pressure curve 368 crosses atmospheric pressure at the leading and trailing edges of chevron 332 (points U and V, respectfully), and reaches its lowest point at approximately the center (along line A—A) of chevron 332. Pressure curve 368 peaks again just forwardly of rearward edge 350 (point Y), and drops dramatically (to slightly below atmospheric pressure) just behind edge 350. Pressure gradient curve 368 then rises to atmospheric pressure at slider trailing edge 308 (point Z).

We believe that the amount by which the pressure builds-up under each side rail 322, 324 behind respective chevron 330, 332 is related to the roll stiffness of slider 300, that is, the resistance of slider 300 to roll. Thus, spacing side rail edges 348 and 350 from trailing edge 308 decreases the roll stiffness of slider 300 somewhat by limiting the lengths of side rails 322, 324 behind chevrons 330, 332. Thus, this spacing should not be made so large as to reduce roll stiffness so much that roll cannot be counteracted by the rail and chevron configuration of slider 300.

Because island 302 projects only marginally into subambient cavity 352, it does not adversely affect the ability of slider 300 to fly above the disk surface, even at low flying heights such as 4 microinches or less. One reason for this is that channels 362, 364 provide effective routes for the flowing air. Further, inclined island edges 361 and chevrons 330, 332 aid in ejecting debris that may pass through slider 300, thereby discouraging debris build-up that would otherwise retard the flying characteristics of slider 300. This significantly reduces the risk of so-called "crashes" in which the slider collides with disk during high speed disk rotation.

Because island 302 is laterally centered with respect to central axis 306, island 302 does not impart any significant roll bias to slider 300. Moreover, any slight bias that island 302 introduced remains constant with yaw angle and is thus easily corrected, for example, by counterweights. In addition, note that if slider 300 were to roll, it would roll about axis 306 and thus the effect of rolling on transducer 304 would be less than if transducer 304 were mounted closer to one of the sides 318, 320 of slider 300(such as behind the trailing edge of a side rail 322, 324).

We have found that moving chevrons 330, 332 upstream to forward ends 326 of side rails 322, 324 reduces the sensitivity of the flying height of slider 300 to changes in the altitude at which the disk drive is operated. As is known, the flying height of a slider decreases with increases in the ambient altitude, due to reductions in atmospheric pressure. We have found that moving chevrons 330, 332 to junctions 328 between cross rail 316 and forward ends 326 of side rails 322, 324 reduces the amount of change in the flying height of slider 300 for a given change in altitude. For example, our experiments have shown that the flying height of slider 300 (measured at trailing edge 308) decreases by only about 1.2 micron inches (from an initial height of 7.0 microinches) over a 10,000 foot increase in altitude; by contrast, the flying height of the slider of FIG. 6 (in which chevrons 150, 152 are spaced somewhat behind cross rail 122) changes by 1.4 microinches over the same altitude change. Thus, the flying height of slider 300 is 15% less sensitive to altitude changes than that of slider 100.

Other island configurations are possible. For example, while side edges 361, 363 of island 302 are in some cases perpendicular to surface 353 to provide island 302 with a nearly uniform cross section and width dimension over its height, the cross section and width of island 302 may vary with height.

Figure 19:
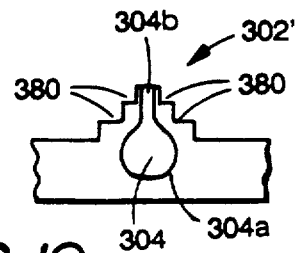
FIG. 19 is a partial trailing edge view showing an alternative island configuration for the slider shown in FIGS. 16 and 17.

Referring also to FIG. 19 (which is not to scale), the width (and hence the cross section) of island 302' decreases with increasing height in a series of discrete steps 380. (Three steps 380 are shown for purposes of illustration only; more or fewer steps can be used.) The width of island 302' thus narrows to somewhat conform with the tapering width of the transducer 304 between its yoke 304a and tip 304b. Of course, the sides of island 302 may be sloped, rather than stepped, to reduce the width of island 302 over height.

Subambient cavity 352 and chevrons 330, 332 may be formed in any suitable way to define island 302 and side rails 322, 324. One method is ion milling, which produces edges (such as rail edges 336, 338, foils 344, 346, and trailing edge 348, 350, as well as island edges 361, 363) that are nearly perpendicular to surfaces 353, 355. An alternative technique is laser etching (with or without chemical assist). (The step 380 in island 304' can also be formed by ion milling or laser etching.)

One disadvantage of laser etching is that it forms edges which are not perpendicular to surfaces 353, 355. In fact, we have found that the "vertical" edges (e.g. rail edges 336, 338, rail foils 344, 346, rail trailing edges 348, 350, and island edges 361, 363) of slider 300 formed by laser etching are actually inclined by only about 22° relative to surfaces 353, 355. The sloped vertical edges increase the roll sensitivity of the slider to changes in yaw angle. We believe that when the slider is positioned at a nonzero yaw angle (either positive or negative yaw), the sloped vertical edges (particularly the inner edges 336, 338 and foils 344, 346 of side rails 322, 324) cause more pressure to build up under the downstream side rail 322, 324 (that is, the rail located to the rear of the yawed slider with respect to air flow) than under the other rail, thereby inducing yaw-angle sensitive roll.

Figure 20:
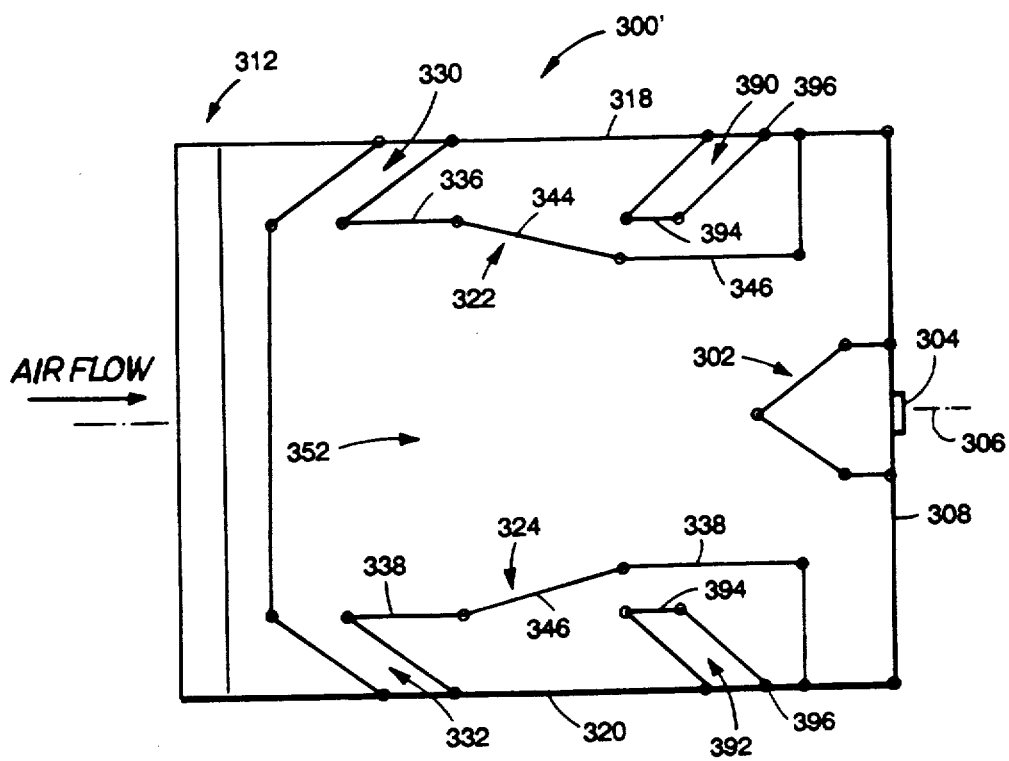
FIG. 20 is a bottom view of a subambient pressure slider according to yet another embodiment of the invention.
Figure 21:
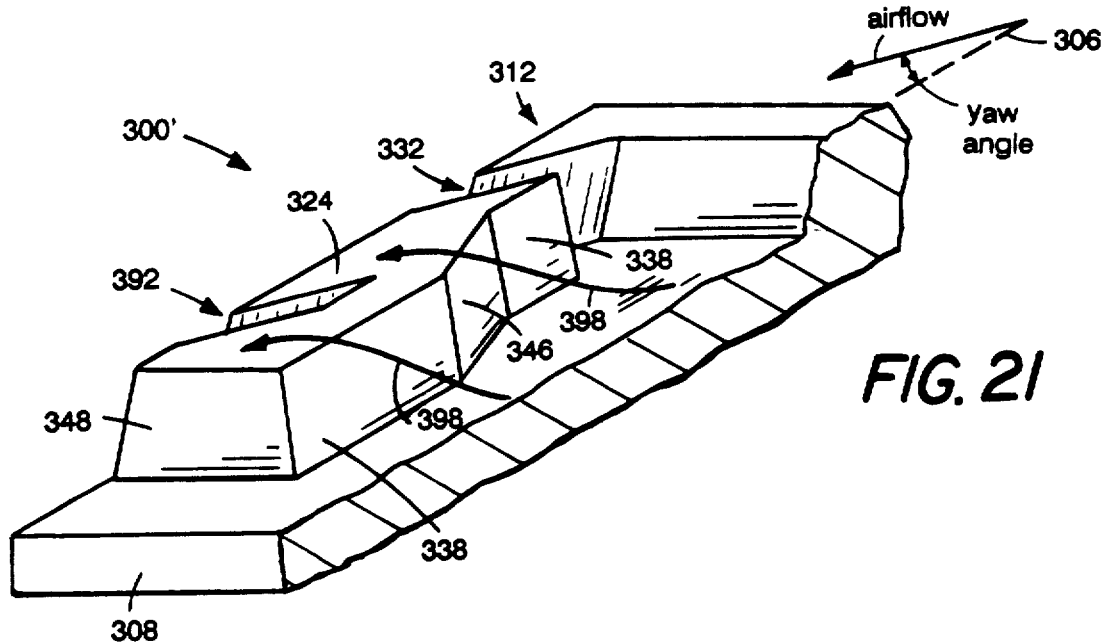
FIG. 21 is a perspective view, partially cut away, of a portion of the slider of FIG. 19.

Referring to FIGS. 20 and 21 (neither of which is to scale), slider 300' is configured to counteract the yaw-angle sensitive roll induced by the sloped vertical edges. (FIG. 20 shows slider 300' at a yaw angle of 0°, with air flow along central axis 306.) More specifically, a second chevron 390, 392 is disposed in each side rail 322, 324 behind chevron 330, 332, respectively. As discussed more fully below, secondary chevrons 390, 392 relieve the additional pressure under side rails 322, 324 caused by sloped vertical edges 336, 338, 344, 346, thereby maintaining high roll insensitivity with respect to yaw angle (The sloped nature of the edges of rails 322, 324 are not shown in FIG. 20 for purposes of clarity. FIG.

2 illustrates the inclination of edges 338, 346 of side rail 324.)

Secondary chevrons 390, 392 are preferably grooves (although other configurations can be used according to application) and have the same depth as subambient cavity 352 and chevrons 330, 332. Chevrons 390, 392 are open at the side edges 318, 320 of slider 300' but do not intersect subambient cavity 352, for purposes to be described. The length of chevrons 390, 392 (i.e., along axis 306) is slightly less than that of chevrons 330, 332. In the "nano" configuration, chevrons 390, 392 are between approximately 0.005 inches and 0.007 inches in length along axis 306. The inside edge 394 of each chevron 390, 392 is approximately 0.009-0.010 inches from the respective slider side 318, 320; thus, chevrons 390, 392 terminate 0.005 inches or less from the inside edges of respective side rails 322, 324.

The rearward end 396 of each secondary chevron 390, 392 is located as close as possible to (for example, 0.004 inches forwardly of) the trailing edge 348, 350 of respective side rail 322, 324. The reason for this is that behind chevrons 330, 332, pressure beneath each side rail 322, 324 is highest near the trailing edge of the side rail. Placing chevrons 390, 392 adjacent trailing edges 348, 350 ensures that chevrons interrupt the pressure at its highest point, thereby more effectively counteracting the increased pressure build-up caused by the sloped vertical rail surfaces.

Secondary chevrons 390, 392 are oriented obliquely to slider longitudinal axis 306 to assist in channeling debris from beneath rails 322, 324 to the sides of slider 300'. This helps prevent the debris from becoming lodged in chevrons 390, 392 and possibly interfering with the ability L/C of slider 300' to fly above the disk surface. Preferably, chevrons 390, 392 are arranged at the same angle to axis 306 as chevrons 330, 332 (e.g., 45°).

Figure 22:
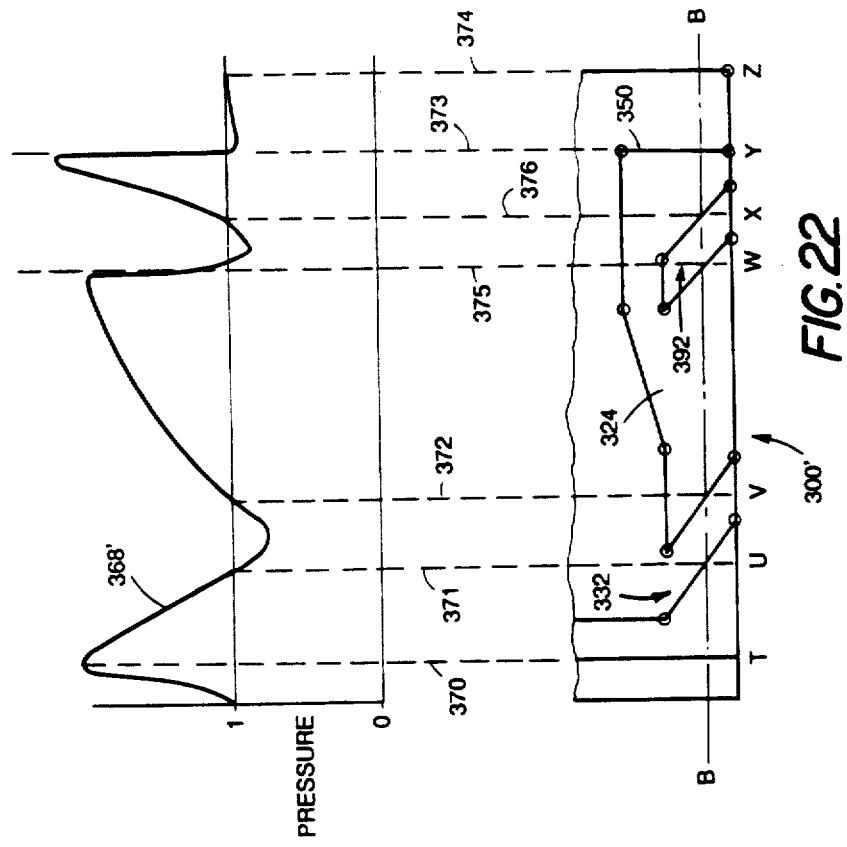
FIG. 22 relates to the pressure profile for an inner rail or outer rail to the rail configuration of the slider of FIG. 20.

Referring also to FIG. 22, in operation, with slider 300' yawed so that, e.g., side rail 324 is positioned downstream of rail 322 with respect to air flow, air 398 flows over sloped surfaces 338, 344 and under the portion of side rail 324 disposed behind chevron 332, thereby increasing the pressure under side rail 324 relative to side rail 322. This can be seen by comparing expected pressure gradient curve 368' (taken along line B—B of FIG. 22) with gradient curve 368. Chevron 392 relieves the pressure under rail 324 at its highest level behind chevron 332, decreasing the pressure to below atmospheric level at approximately the center (along line B—B) of chevron 392. Gradient pressure curve 368' crosses atmospheric pressure at the leading and trailing edges of chevron 392 (points W and X, respectively), as shown by lines 375 and 376. Although pressure again builds up somewhat behind chevron 392 until trailing edge 350 is reached (point Y), we believe that the interruption in pressure caused by chevron 392 effectively counteracts the increased pressure under rail 324 induced by sloped edges 338, 344.

Like chevrons 330, 332, secondary chevrons 390, 392 need not be grooves—other configurations can be used. Chevrons 390, 392 should open to the outside of slider 300', otherwise they may not effectively relieve the pressure under rails 322, 324. Although there may be applications in which chevrons 390, 392 can intercept subambient cavity 352, doing so may reduce the roll stiffness of slider 300' to unacceptably low levels. One reason for this is that, because of the communication with cavity 352, chevrons 390, 392 will reduce the pressure under rails 322, 324 more than that shown in FIG. 22, thereby decreasing the forces between the disk and slider under the rails and lowering the ability of the slider to resist roll. (Note that the small spacing between chevrons 390, 392 and rearward edges 348, 350 leaves little room beneath rails 322, 324 for the pressure to re-build after relief by chevrons 390, 392.)

Still other embodiments are within the scope of the following claims.

What is claimed is:

1. A slider for moving a transducer across a surface of a rotating storage disk while maintaining the transducer in proximity to and spaced from the disk surface, said slider having a cavity for developing a subambient pressure as the disk rotates that tends to draw said slider toward the disk surface, said cavity being bounded by portions of said slider that are raised from a lower surface opposing said storage disk, said slider comprising an island that protrudes from said lower surface of said slider for supporting said transducer, at least a portion of said island being disposed outside of said cavity, said island having length and width dimensions that are less than those of said slider.

2. The slider of claim 1 wherein said island is disposed to position said transducer centrally with respect to the width dimension of said slider.

3. The slider of claim 1 wherein said cavity extends longitudinally along the length dimension of said slider between a forward edge and a rearward edge said slider, said island being disposed adjacent to said rearward edge and terminating substantially rearwardly of said forward edge.

4. The slider of claim 3 wherein said island does not substantially extend longitudinally into said cavity.

5. The slider of claim 1 wherein said portions include a pair of spaced, longitudinally extending side rails disposed between a forward edge of said slider and a rearward edge of said slider for defining said cavity therebetween.

6. The slider of claim 1 wherein said island has a selected height dimension with respect to said cavity surface, said width dimension of said island being substantially constant over said height dimension.

7. The slider of claim 5 wherein said island is laterally disposed between said rails.

8. The slider of claim 7 wherein said island is laterally spaced from each of said side rails.

9. The slider of claim 1 wherein said island is disposed adjacent to a rearward edge of said slider and extends forwardly along a longitudinal axis of said slider, a forward portion of said island being oriented obliquely with respect to said longitudinal axis.

10. The slider of claim 9 wherein said island includes a pair of forwardly extending sides each of which is inclined with respect to said longitudinal axis.

11. The slider of claim 10 wherein said inclined sides meet at a forward end of said slider.

12. The slider of claim 1 wherein said portions include a pair of spaced, longitudinally extending side rails for defining said cavity therebetween, said rails having surfaces that face said disk, at least one of said rails including means for maintaining the distance between said surface of one said rail and the disk surface equal to the distance between said surface of the other said rail and the disk surface as said slider moves across the disk surface.

13. The slider of claim 12 wherein said means for maintaining includes a groove positioned to allow air to flow between said cavity and an area outside of said cavity.

14. The slider of claim 13 wherein both of said rails include said groove.

15. A slider for moving a transducer across a surface of a rotating storage disk while maintaining the transducer in proximity to and spaced from the disk surface, said slider comprising
- a pair of spaced, longitudinally extending side rails disposed between a forward edge of said slider and a rearward edge of said slider for defining a cavity therebetween for developing a subambient pressure as the disk rotates that tends to draw said slider toward the disk surface, said rails terminating at end disposed forwardly of said rearward edge of said slider, and
- an island that protrudes from a surface of said cavity for supporting said transducer, said island having length and width dimensions that are less than those of said slider, said island being disposed adjacent to said rearward edge and terminating proximate to said ends of said rails.

16. A slider for moving a transducer across a surface of a rotating storage disk while maintaining the transducer in proximity to and spaced from the disk surface, said slider having a cavity for developing a subambient pressure as the disk rotates that tends to draw said slider toward the disk surface, said slider comprising
- an island that protrudes from a surface of said cavity for supporting said transducer, said island having length and width dimensions that are less than those of said slider said island having a selected height dimension with respect to said cavity surface, said width dimension decreasing along said height dimension.

17. The slider of claim 16 wherein said width dimension decreases in a plurality of steps along said height dimension.

18. A slider for moving a transducer across a surface of a rotating storage disk while maintaining the transducer in proximity to and spaced from the disk surface, said slider having a cavity for developing a subambient pressure as the disk rotates that tends to draw said slider toward the disk surface, said slider comprising
- an island that protrudes from a surface of said cavity for supporting said transducer, said island having length and width dimensions that are less than those of said slider, and
- a pair of spaced, longitudinally extending side rails for defining said cavity therebetween, said rails having surfaces that face said disk, at least one of said rails including a groove constructed to allow air to flow between said cavity and an area outside said cavity for maintaining the distance between said surface of one said rail and the disk surface equal to the distance between said surface of the other said rail and the disk surface as said slider moves across the disk surface, said side rails being disposed between a forward edge of said slider and a rearward edge of said slider, said side rails having forward ends that are coupled together by a ramp section to define a forward end of said cavity, said groove being positioned at said forward end of said one rail.

19. The slider of claim 10 wherein said groove is disposed at an oblique angle with respect to a longitudinal axis of said slider.

20. A slider for moving a transducer across a surface of a rotating storage disk while maintaining the transducer in proximity to and spaced from the disk surface, said slider having a cavity for developing a subambient pressure as the disk rotates that tends to draw said slider toward the disk surface, slider comprising
- an island that protrudes from a surface of said cavity for supporting said transducer, said island having length and width dimensions that are less than those of said slider,
- a pair of spaced, longitudinally extending side rails for defining said cavity therebetween, said rails having surfaces that face said disk, at least one of said rails including a groove constructed to allow air to flow between said cavity and an area outside said cavity for maintaining the distance between said surface of one said rail and the disk surface equal to the distance between said surface of the other said rail and the disk surface as said slider moves across the disk surface, said side rails being disposed between a forward edge of said slider and a rearward edge of said slider, and
- a second groove disposed in at least one of said rails rearwardly of said groove.

21. The slider of claim 20 wherein both of said rails include said groove and said second groove.

22. A slider for moving a transducer across a surface of a rotating storage disk while maintaining the transducer in proximity to and spaced from the disk surface, said slider comprising
- a pair of spaced, longitudinally extending rails, each having a surface for facing the disk, said rails having forward ends that are coupled together by a ramp section to form a cavity, said cavity developing a subambient pressure that tends to draw said slider toward the surface of the disk as the disk rotates,
- at least one of said rails having a groove positioned at said forward end thereof proximate to said ramp section to allow air to flow between said cavity and an area outside of said cavity, said groove being oriented in said at least one of said rails to reduce the pressure developed under said at least one of said rails in the region of said groove as the disk rotates, said groove serving to maintain the distance between said surface of one said rail and the disk surface equal to the distance between the surface of the other said rail and the disk surface as said slider moves across the disk surface.

23. The slider of claim 22 wherein both of said rails include said groove.

24. The slider of claim 22 further comprising a second groove disposed in said rail rearwardly of said groove.

25. The slider of claim 24 wherein said second groove is open at a side of said slider and is spaced from said cavity by a portion of said rail.

26. The slider of claim 25 wherein said cavity, said groove, and said second groove are relieved to substantially the same depth.

27. The slider of claim 24 wherein both of said rails include said groove and said second groove.

28. The slider of claim 22 wherein said groove is oriented in said first rail to extend between said cavity and said area outside of said slider in a direction away from said forward end.

29. A slider for moving a transducer across a surface of a rotating storage disk while maintaining the transducer in proximity to and spaced from the disk surface, said slider comprising,
- a pair of spaced, longitudinally extending rails, each having a surface for facing the disk, said rails defining a cavity therebetween, said cavity developing a subambient pressure that tends to draw said slider toward the surface of the disk as the disks rotates,
- an island that protrudes from a surface of said cavity for supporting said transducer centrally with respect to a width dimension of said slider, said island terminating rearwardly of a forward edge of said slider and being disposed between and laterally spaced from sad rails,
- at least one of said rails having a plurality of grooves disposed therein for maintaining the distance between said surface of said one rail and the disk surface equal to the distance between said surface of the other said rail and the disk surface as said slider moves across the disk surface,
- a first one of said grooves intersecting said cavity to allow air to flow between said cavity and an area outside of said slider, and a second one of said grooves being spaced from the cavity by a portion of said one rail.

30. A slider for moving a transducer across a surface of a rotating storage disk while maintaining the transducer in proximity to and spaced from the disk surface, said slider comprising
- a pair of spaced, longitudinally extending rails, each having a surface for facing the disk, said rails having forward ends that are coupled together by a ramp section to form a cavity, said cavity developing a subambient pressure that tends to draw said slider toward the surface of the disk as the disk rotates,
- at least one of said rails having a groove positioned at said forward end thereof to allow air to flow between said cavity and an area outside of said cavity, said groove serving to maintain the distance between said surface of said one rail and the disk surface equal to the distance between the surface of the other said rail and the disk surface as said slider moves across the disk surface, and
- an island that protrudes from a surface of said cavity for supporting said transducer.

31. The slider of claim 30 wherein said island terminates rearwardly of said forward ends of said rails and is disposed between and laterally spaced from said side rails.

32. The slider of claim 31 wherein said island is disposed to position said transducer centrally with respect to a width dimension of said slider.

33. The slider of claim 31 wherein said island is coextensive with a rearward edge of said slider, said side rails terminating forwardly of said rearward edge.

34. A slider for moving a transducer across a surface of a rotating storage disk while maintaining the transducer in proximity to and spaced from the disk surface, said slider comprising,
- a pair of spaced, longitudinally extending rails, each having a surface for facing the disk, said rails defining a cavity therebetween, said cavity developing a subambient pressure that tends to draw said slider toward the surface of the disk as the disk rotates,
- at least one of said rails having a plurality of grooves disposed therein for maintaining the distance between said surface of one said rail and the disk surface equal to the distance between said surface of the other said rail and the disk surface as said slider moves across the disk surface,
- a first one of said grooves intersecting said cavity to allow air to flow between said cavity and an area outside of said slider, and a second one of said grooves terminating at an end that is spaced from the cavity by a portion of said one rail.

35. The slider of claim 34 wherein said rails extend between a forward edge of said slider and a rearward edge of said slider, said first groove being disposed forwardly of said second groove.

36. The slider of claim 35 wherein said rails have forward ends that are coupled together by a ramp section, said first groove being disposed at said forward end of said one rail.

37. The slider of claim 35 wherein at least said one rail is configured to develop relatively high pressure thereunder as air flows between the slider and the disk surface to cause said slider to be lifted above the surface of the disk, said cavity developing a subambient pressure that tends to draw said slider toward the surface of the disk, said first groove being configured to relieve said relatively high pressure and induce relatively low pressure thereunder.

38. The slider of claim 34 wherein said first groove and said second groove are disposed in both of said side rails.

39. A slider for moving a transducer across a surface of a rotating storage disk while maintaining the transducer in proximity to and spaced from the disk surface, said slider comprising
- a pair of spaced, longitudinal extending rails, each having a surface for facing the disk, said rails extending between a forward edge of said slider and a rearward edge of said slider, at least one of said rails being configured to develop relatively high pressure thereunder as air flows between the slider and the disk surface to cause the slider to be lifted above the surface of the disk, said rails having side surfaces that define a cavity therebetween, said cavity developing a subambient pressure that tends to draw said slider toward the surface of the disk as the disk rotates,
- at least one of said rails having a plurality of grooves disposed therein for maintaining the distance between said surface of one said rail and the disk surface equal to the distance between said surface of the other said rail and the disk surface as said slider moves across the disk surface, a first one of said grooves intersecting said cavity to allow air to flow between said cavity and an area outside of said slider, said first groove being configured to relieve said relatively high pressure and induce relatively low pressure thereunder,
- at least said side surface of said one rail being disposed obliquely to a lower surface of said cavity and tending to induce an inequality between the distance from said surface of said one rail to the disk surface and the distance from said surface of the other said rial to the disk surface, and
- a second one of said grooves being spaced from the cavity of a portion of said rail, said first groove being disposed forwardly of said second groove, said second groove being configured to relieve said relatively high pressure and induce relatively low pressure thereunder, thereby to substantially correct said inequality.

40. A slider for moving a transducer across a surface of a rotating storage disk while maintaining the transducer in proximity to and spaced from the disk surface, said slider comprising
- a pair of spaced, longitudinally extending rails, each having a surface for facing the disk, said rails having forward ends that are coupled together by a ramp section to form a cavity, said cavity developing a subambient pressure that tends to draw said slider toward the surface of the disk as the disk rotates,
- at least one of said rails having a groove that allows air to flow between said cavity and an area outside of said cavity, said groove being positioned at the forward end of said at least one of said rails so that said groove intersects said cavity at a junction between said forward end and said ramp section, said groove serving to maintain the distance between said surface of one said rail and the disk surface equal to the distance between the surface of the other said rail and the disk surface as said slider moves across the disk surface.

41. The slider of claim 40 wherein said groove is disposed at an oblique angle with respect to a longitudinal axis of said slider.

* * * * *

UNITED STATES PATENT AND TRADEMARK OFFICE
CERTIFICATE OF CORRECTION

PATENT NO.   : 5,309,303

DATED        : May 3, 1994

INVENTOR(S)  : Yiao-Tee Hsia et al.

It is certified that error appears in the above-identified patent and that said Letters Patent is hereby corrected as shown below:

Col. 1, line 6, replace "Feb. 8" with --Feb. 28--.

Col. 5, line 2, replace "b" with --by--.

Col. 8, line 54, after "316" insert a period.

Col. 9, line 30, replace "Well" with --well--.

Col. 12, line 6, replace "micron inches" with --microinches--.
         line 37, replace "304'" with --302'--.

Col. 13, line 1, replace "2" with --21--;
         line 34, delete "L/C".

Col. 15, claim 19, line 66, replace "10" with --18--.

Signed and Sealed this

First Day of October, 1996

*Attest:*

BRUCE LEHMAN

*Attesting Officer*    *Commissioner of Patents and Trademarks*